(12) United States Patent
Offerman et al.

(10) Patent No.: US 6,353,581 B1
(45) Date of Patent: Mar. 5, 2002

(54) MEDIA ACCESS IN A MEDIA LIBRARY

(75) Inventors: Karl B. Offerman; Kevin T. Kersey, both of San Diego, CA (US)

(73) Assignee: Overland Data, Inc., San Diego, CA (US)

( * ) Notice: Subject to any disclaimer, the term of this patent is extended or adjusted under 35 U.S.C. 154(b) by 0 days.

(21) Appl. No.: 09/191,222

(22) Filed: Nov. 13, 1998

Related U.S. Application Data (60) Provisional application No. 60/065,706, filed on Nov. 14, 1997.

(51) Int. Cl.⁷ .......................... G11B 17/22; G11B 15/68
(52) U.S. Cl. ............................ 369/36; 369/192; 360/92
(58) Field of Search ........................... 369/32, 33, 34, 369/36, 38, 178, 179, 191, 192; 360/92, 98.04, 98.05, 98.06

(56) References Cited

U.S. PATENT DOCUMENTS

| | | | | |
|---|---|---|---|---|
| 5,537,267 A | * | 7/1996 | Nelson et al. ................ 360/92 |
| 5,757,738 A | * | 5/1998 | Ohba et al. .................... 369/34 |
| 5,847,897 A | * | 12/1998 | Marlowe ...................... 360/92 |
| 5,910,939 A | * | 6/1999 | Shiba et al. ................. 369/178 |
| 5,953,293 A | * | 9/1999 | Kajiyama et al. ............. 369/37 |

OTHER PUBLICATIONS

Spectra Logic: 4mm Automated Tape Library; Product Information document on Spectra 4000 consisting of 4 pages (Date Unknown).

ATL Products: Solutions for the Implementing Data Storm; Product Information sheet on ACL 4/52 (1995).

* cited by examiner

*Primary Examiner*—David L. Ometz
(74) *Attorney, Agent, or Firm*—Knobbe Martens Olson & Bear LLP (57) ABSTRACT

A media element library includes a magazine of media element storage locations comprising at least one cell adjacent to an opening in the housing. The cell may be moveable so as to extend toward the opening in the housing of the media element library, thereby facilitating user access to a media element stored in the moveable cell.

22 Claims, 7 Drawing Sheets

MEDIA ACCESS IN A MEDIA LIBRARY

CROSS REFERENCE TO RELATED APPLICATIONS

This application claims priority under 35 U.S.C. § 119(e) to U.S. Provisional Application Serial No. 60/065,706 entitled MEDIA ACCESS IN A MEDIA LIBRARY, filed on Nov. 14, 1997. The disclosure of the MEDIA ACCESS IN A MEDIA LIBRARY provisional patent application is hereby incorporated by reference in its entirety.

BACKGROUND OF THE INVENTION

1. Field of the Invention

The present invention relates to the field of data processing systems. More particularly, the invention pertains to a media element library which allows a user to easily access a media element inside a magazine of media elements without having to remove the magazine from the media element library. In one advantageous embodiment, the media elements are tape cartridges.

2. Description of the Related Art

Magnetic tape cartridges, magnetic disks and optical disks are all widely used as peripheral memory storage devices for computer systems. Large computer systems often operate in conjunction with external libraries of several, dozens, or even hundreds of such media elements. Although originally such media elements were selected and loaded manually, automated libraries were developed to expedite the handling of the media. These systems typically include robotics for accessing a desired media element, retrieving it from its storage position and loading it into an appropriate reader.

As data storage requirements for computer systems have increased from megabytes to gigabytes to terabytes, the development of automated media libraries has received considerable attention. Some embodiments of magnetic tape libraries comprise a small number of magnetic tape cartridges, 5 to 15 being typical, and one or two tape drives housed in a single enclosure. Cabinet and even room-sized systems have also been developed which hold a much larger number of tapes and drives and which further comprise robotic arms, usually translatable on all three axes, which remove tapes from storage and place them in tape drives.

Security of the physical media elements is of concern in these libraries. Generally, automated tape libraries are locked enclosures or cabinets, allowing complete access to the media elements stored inside only to users with the appropriate key or password. However, it is often desirable to allow limited access to media elements to other, lower level users of the system. In these cases, "mail slots" have been provided which receive individual media elements or groups of media elements from the internal robotic transport mechanism and route them outside the enclosure through the mail slot. Use of the mail slot may itself be limited to users having particular passwords, and system control software may dictate what media elements are available through the mail slot to various users having these passwords. For example, the system administrator may have access to the entire cabinet, while lower level clerks have access only to the mail slot to place blank tapes into the library, or to retrieve selected media elements from the library one or a few at a time. Users not given passwords by the system administrator may be able to store and retrieve data electronically, but will not be able to physically access any physical media elements in the library.

These prior art systems are complex and expensive to manufacture, requiring an independent transport path between a rack or magazine of media element storage locations and the mail slot. A data storage and retrieval system which allows a user to quickly add or replace tape cartridges without having to remove the magazine of media elements, without requiring complicated transport mechanisms, and without limiting system options for media access security has long been manifest.

SUMMARY OF THE INVENTION

In one embodiment, the invention comprises a media element library comprising a housing having a door, and a plurality of coupled media element storage locations forming a media element magazine. In this embodiment, at least a first media element storage location of the media element magazine is positioned relative to the door such that a media element in this storage location is accessible from outside the housing when the door is open. In addition, at least a second media element storage location of the media element magazine is positioned relative to the door such that a media element in this media element storage location is inaccessible from outside the housing when the door is open.

Methods of accessing media elements from media element libraries are also provided. In one embodiment such a method comprises delivering a media element to a cell of a media element magazine, moving the cell toward an opening in the media element library and away from other cells in the media element magazine, and removing the media element from the cell.

Media element magazines also are provided which may comprise a plurality of media element cells for storing media elements and a movable cell attached at one end of the media element magazine.

DETAILED DESCRIPTION OF THE INVENTION

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention.

Furthermore, embodiments of the invention may include several novel features, no single one of which is solely responsible for its desirable attributes or which is essential to practicing the inventions herein described. After considering this discussion, one will understand how the features of this invention provide advantages which include flexibility in design, the ability to house numerous media elements, and easy access to any media element in the library.

Figure 1:
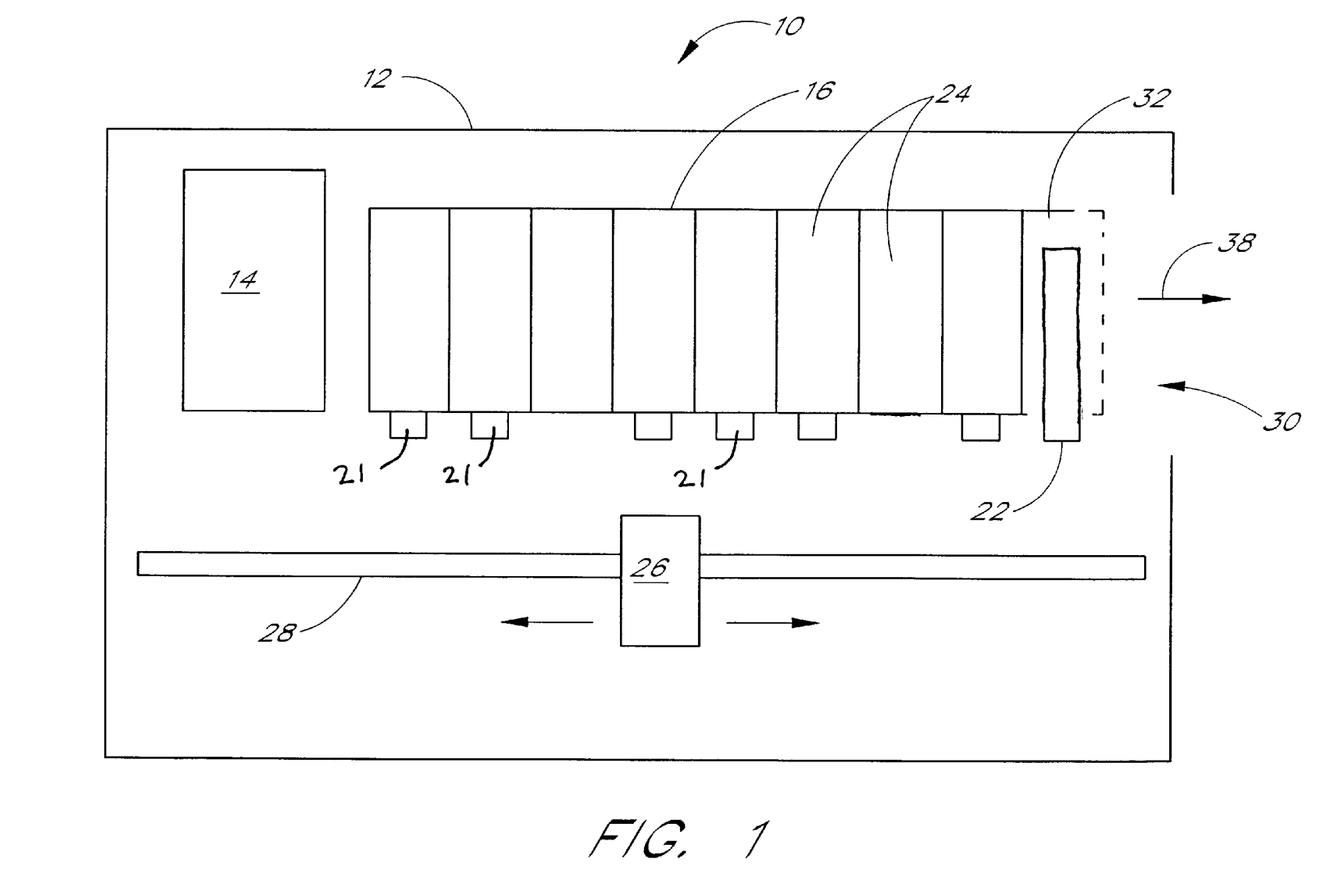
FIG. 1 is a top plan view of a media element library illustrating incorporating aspects of the invention.

FIG. 1 illustrates a media element library 10 and some of its internal components. The library 10 of FIG. 1 may include a housing 12, one or more media element readers 14 and a media element magazine 16 for holding a plurality of media elements 21, 22 in individual storage locations or cells 24. Those skilled in the art will appreciate that the media element library 10 may be of many different configurations. It may, for example, comprise multiple media element readers 14 and media element magazines 16 depending on the sophistication of data processing and storage desired. Alternatively, the library may contain only a media element magazine and no media element reader. In embodiments having no media element reader, the library 10 may be provided with an automatic transfer mechanism to transfer media elements to another module or portion of a library that includes a media element reader. One example of a media element library which includes separate modules for media elements and media element readers is provided by U.S. Pat. No. 5,285,333 to Barr et al.

The media element library 10 may also incorporate a media element transport robot 26 which travels along a track 28 and carries media elements 22 between the magazine 16 and and the media element reader 14. The robot 26 is configured such that it can insert and withdraw a media element 22 from either the cells 24 of the magazine 16 or the media element reader 14. Control of library operation is typically performed via a host computer, although some aspects of library operation may be controlled through a keypad integral to the library itself. Many aspects of media element library design and operation are set forth in co-pending U.S. patent application No. 08/555,776, filed on Nov. 9, 1995, entitled MODULAR CABINET FOR DATA STORAGE MEDIA AND DRIVES, now U.S. Pat. No. 5,870,245. The disclosure of this application 08/555,776 is hereby incorporated by reference in its entirety.

It will be appreciated that the library 10 advantageously allows for placing media elements into the library and removing media elements from the library when so desired by a user. In one embodiment of the invention, the library includes an opening 30 in the housing 12 which may be used to access the media elements 22. Although not illustrated in FIG. 1, the opening 30 may be covered by a door which can be opened by the user to access media elements 22.

As shown in FIG. 1, some embodiments of the invention include media element libraries in which a portion of the magazine 16 is proximate to the opening 30. An advantageous aspect of this design is that one of the cells of the magazine may be manually accessible to a user of the system through the opening 30. In the embodiment of FIG. 1, the end cell 32 is manually accessible through the opening. This cell may advantageously be constructed such that the media element 22 which is in this cell 32 may be manually grasped and removed from the library 10 through the opening 30. The magazine 16, the end cell 32, the opening 30, and their relative placement may also be designed such that the media element 22 in the end cell 32 is manually accessible, while the other media elements in the other cells of the magazine are not accessible through the opening 30. It will be appreciated that in some embodiments, several media elements (rather than only one) of the total stored in the magazine, such as a group of two or three media elements, may be accessible through the opening 30, while the remainder are not.

Thus, if the robot 26 delivers a media element to the cell 32 located at one end of the magazine 16, this media element 22 will become available for easy removal by the user of the library 10. In addition, if no media element is present in the end cell 32, the user may place a new media element into the empty end cell 32, thereby adding an additional media element to the library. This new media element may, if desired, then be moved to a different storage location 24 by use of the robot 26.

In some embodiments of the invention, one of which will be described in additional detail below, the end cell 32 of the magazine is moveable toward the opening 30 in order to further facilitate user access to the media element in that cell. In this embodiment, the cell 32 closest to the opening 30 is moveable in the direction of the arrow 38 while the remainder of the magazine 16 may remain stationary and inaccessible through the opening 30.

This configuration, wherein the mail slot form a part of the magazine, provides several advantages over currently used systems. Media access is made simpler and more efficient with less expensive hardware. Furthermore, the configuration and positioning of the magazine 16, end cell 32, and opening 30 allows different media access security levels to be implemented without providing a remote mail slot which must be separately serviced by the library robotics. As will be explained in additional detail below, one level of access authorization may comprise allowing a particular set of users to open a door covering the opening 30 so as to access only the media element in the end cell 32. A second level of access authorization may allow a particular set of users to uncouple the magazine 16 itself from the library 10, so as to remove it from the enclosure 12 and obtain access to all of the media elements 21, 22 in the library.

Figure 2:
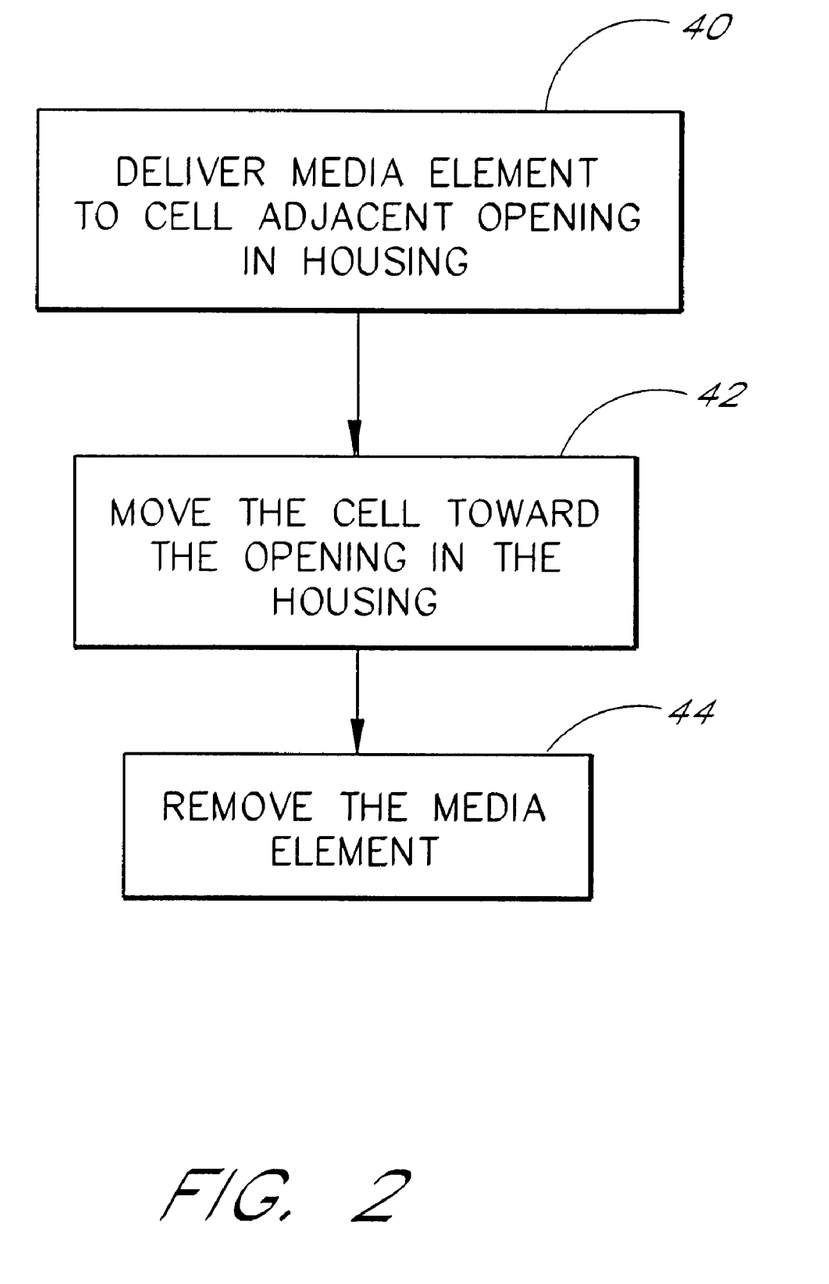
FIG. 2 is a flow chart of a method to access a media element from a media element library.

Referring now to the flow chart shown in FIG. 2, a method of accessing a specific media element 22 in a "moveable cell" embodiment is described. It will be appreciated that the method illustrated by FIG. 2 may be implemented, in one embodiment, with the structure shown in FIG. 1, although other hardware embodiments of this method may be devised by those of skill in the art. The method is initiated at step 40 of FIG. 2, where a desired media element is delivered to a storage location adjacent to an opening in the housing of the library. At step 42, the storage location is then moved toward the opening. Finally, at step 44, the media element is removed from the moved storage location.

This method is a significant improvement over the prior art. In currently known access methods, magazine storage locations are not provided adjacent to openings and configured such that one of the storage locations of the magazine is accessible through an opening in the housing of the library. Nor have prior art magazine storage locations been made moveable toward the opening in the housing to maximize access convenience. Those of skill in the art will further appreciate that the present invention has application to all types of data storage media such as optical disks, magnetic disks, and magnetic tape cartridges. In one advantageous embodiment described in detail with reference to FIGS. 3–7, a magnetic tape cartridge library incorporates features of the invention.

Figure 3:
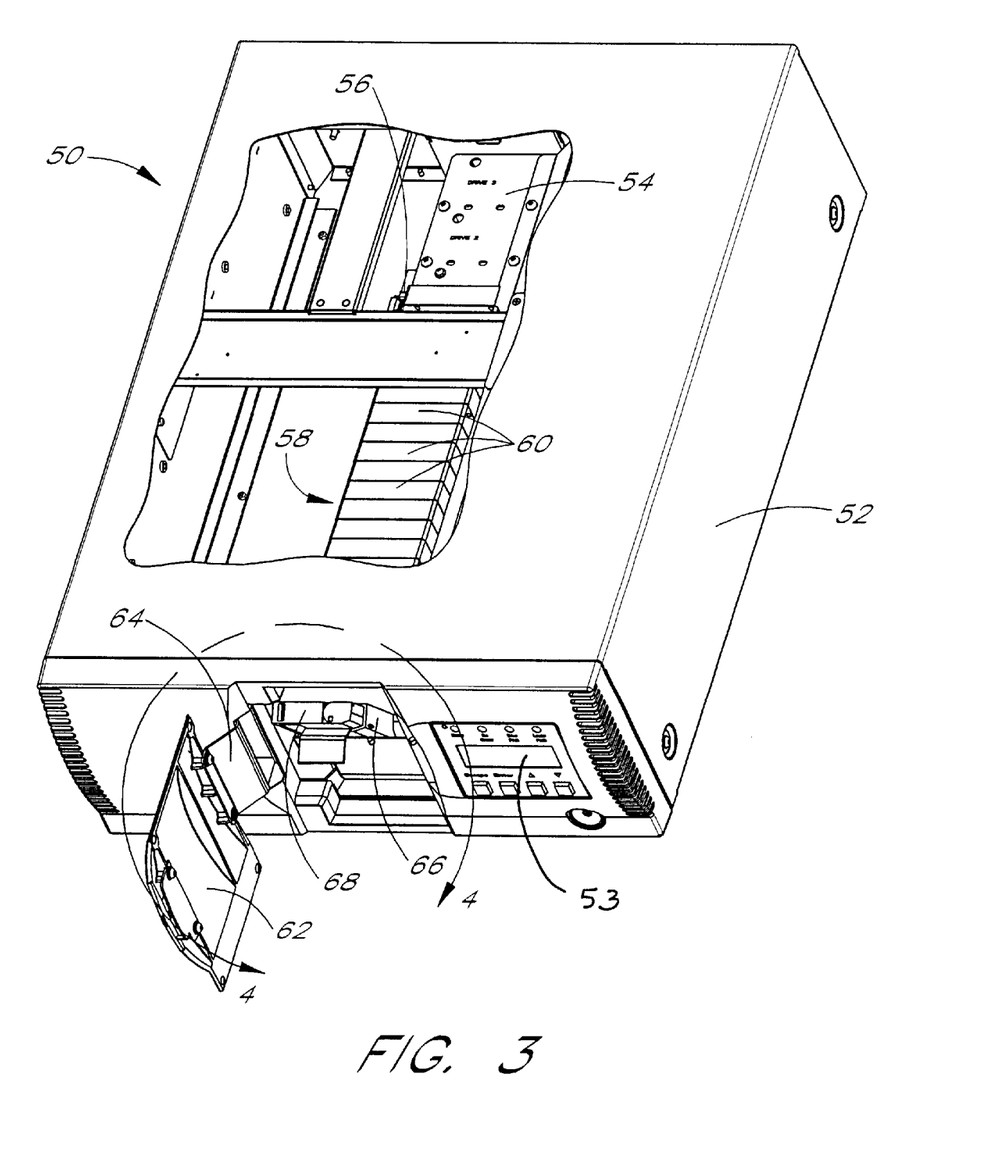
FIG. 3 is a perspective view of one embodiment of a media library which incorporates a pivotable moveable magazine cell and which has a portion of its top panel cut away to illustrate some internal components of the library.

FIG. 3 illustrates a perspective view, with a cutaway portion, of a tape cartridge library 50 incorporating aspects of the invention. The library includes a housing 52, which may be configured to fit an EIA Standard RS-310C rack. The library 50 may also include a display and keypad 53, which can be used to give certain commands to the library and receive status information from the library as is well known in the art. Inside the housing 52 are mounted several tape drive mounting brackets 54. In the specific library shown, only one of the mounting brackets has a tape drive 56 installed. As described above, however, any number of tape drives 56 may be provided in the library. Also present in the embodiment of FIG. 3 is a tape cartridge magazine 58 having a plurality of cells or tape cartridge storage locations 60. The system may be designed to accommodate any standard tape cartridge used for data storage.

In the embodiment of FIG. 3, the front panel of the library 50 has a door 62 which covers an access opening in the housing 52. The door 62 is pivotably attached to the front panel of the housing 52 by a hinge 64 that is fastened to the front panel of the housing 12 and to the door. One end of the magazine 58 is adjacent to door 62 such that a movable cell 66 of the magazine 58 is near the opening created when the door 62 is open. The movable cell 66 on the end of the magazine 58 may advantageously be pivotably attached to the magazine along the cell 66 bottom edge so that it will lean outward toward the opening in the front panel of the library when pivoted. The outward leaning orientation is illustrated in FIGS. 3 and 4.

This pivotably movable cell 66 may be configured to only partially surround a tape cartridge 68 mounted in the cell 66. Thus, when the pivotably movable cell 66 is leaning outward, a tape cartridge 68 present in the pivotably movable cell 66 can be easily grasped and removed by a user. Further, if the pivotably movable cell 66 is empty, a tape cartridge 68 can be easily installed by a user. Thus, cell 66 positioning relative to the door 62 comprises an advantageously designed mail slot for access to a media element in the library 50 without removing the whole magazine 58 and without interrupting normal library operation. This configuration is much simpler than prior art systems used to access media elements in libraries because it involves no robotic movement to place a tape cartridge in a user access location separate from the magazine 58.

It will be appreciated by those of skill in the art that the cell 66 need not be pivotable or moveable, as long as a media element stored there is accessible and removable through the open door 62. The pivotability of the embodiment of FIG. 3 thus assists in the ease of access, but is not necessary. In addition, as explained above, it is advantageous to configure the magazine 58 and the adjacent access opening such that no manual access is provided to any other cells of the magazine 58 except the end cell 66, so that some users may be given access to the mail slot but not to media elements in the rest of the magazine. Furthermore, as long as no access is provided to other cells of the magazine 58, the robot may continue to manipulate media elements in cells other than the end cell 66 even when the door 62 is in the open position.

Figure 4:
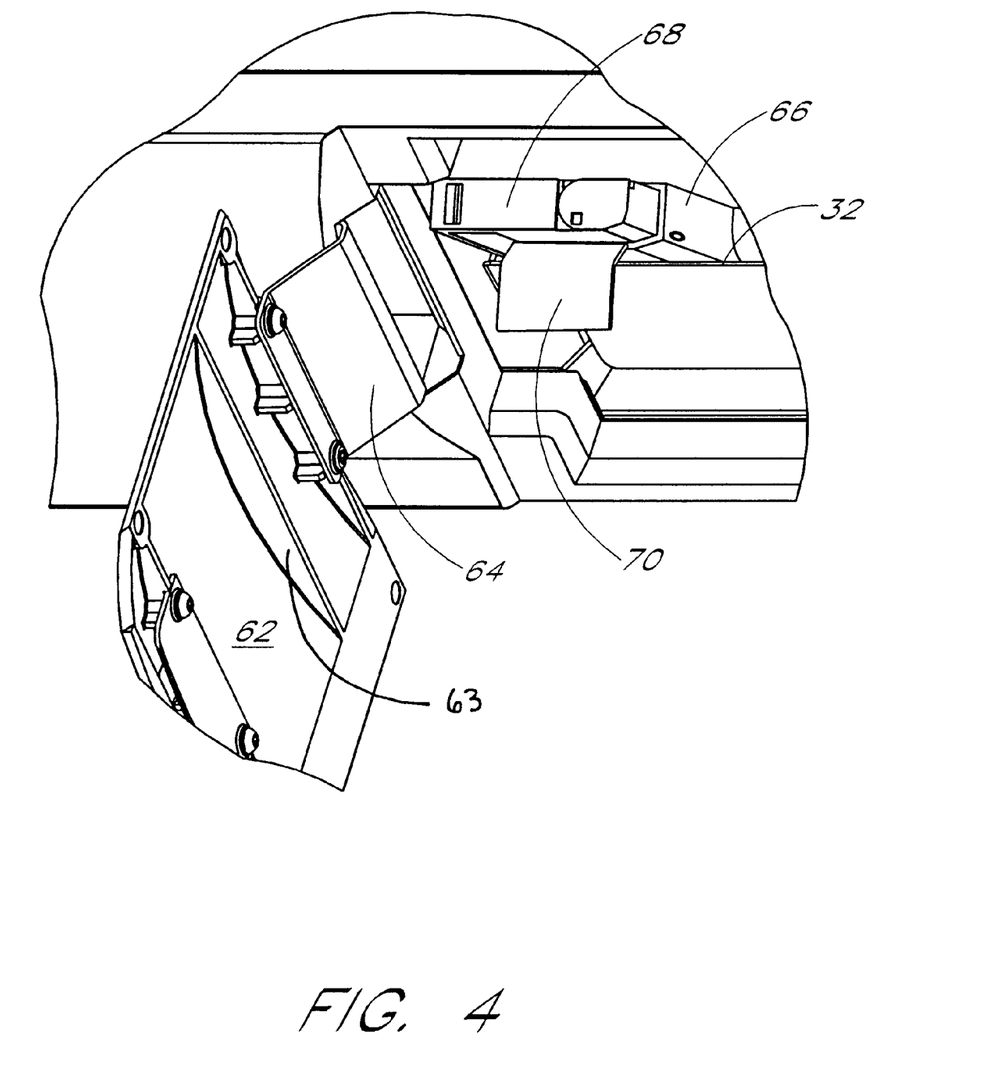
FIG. 4 is an enlarged view of the open door and pivotably moveable cell of FIG. 3.

FIG. 4 shows an enlarged view of the door 62 and pivotably movable cell 66 illustrated in FIG. 3. As can be seen in this Figure, the pivotably movable cell 66 may include an integral tab 70 that a user may grasp to pivot the movable cell 66 toward or away from the opening created when the door 62 is open. The tab 70 may be of many sizes and shapes, limited only by the ability of the door 62 to properly close. Furthermore, the tab 70 and the pivotably movable cell 66 may be either a single piece construction, as illustrated in FIGS. 3 and 4, or may comprise two or more pieces. In the embodiment illustrated in FIGS. 3 and 4, the tab 70 is sized such that if the moveable cell 66 is pivoted outward when the housing door 62 is closed, a rib 63 on the inside surface of the door 62 will contact the tab 70, and the cell 66 will be returned to its upright position by the action of closing the housing door 62.

Removal and replacement of tape cartridges with the above described library system is a more convenient process than is provided by prior art libraries. For example, a user may first instruct a robot to retrieve a selected tape cartridge 68 from its location in the magazine 58 and deliver it to the movable cell 66 adjacent the open door 62 in the housing 52. Upon completion of this operation, a user can then move the cell 66 toward the opening and easily manually grasp the tape cartridge 68 so as to remove or replace it.

The pivotably moveable cell 66 may then be placed back in the upright position. If a new tape has been placed in the cell 66, the user may then instruct the robot to access the movable cell 66 as a normal media storage location provided as part of the magazine 58, or may instruct the robot to remove the tape cartridge 68 from the movable cell 66 and deliver the tape cartridge 68 to any other cell 60 in the magazine 58 for storage.

Figure 5:
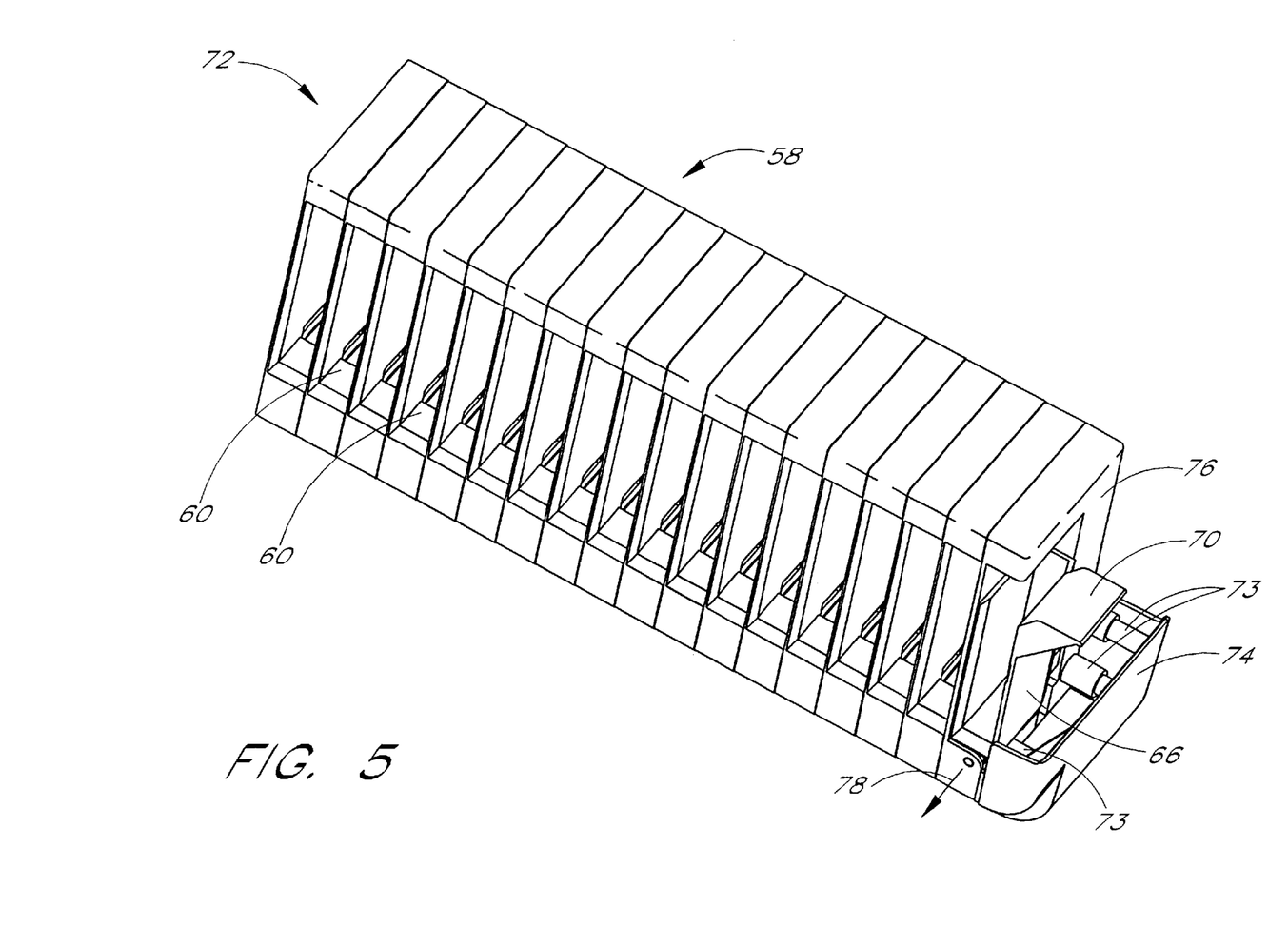
FIG. 5 is a perspective view of the magazine of media elements in the library embodiment of FIGS. 3 and 4, illustrating the pivotably moveable cell in the upright position.

The magazine 58 of FIGS. 3 and 4 is illustrated in FIG. 5, removed from the housing 52 of the library system 50. In this embodiment, the magazine 58 contains 18 storage locations 60. The storage locations 60 may be held together as a unit by long screws (not shown) which extend from the rear side 72 of the magazine and thread into internally threaded sleeves 73 on the other end of the magazine. The magazine 58 may also be provided with a magazine handle 74 for holding onto the magazine 58 when removing the entire magazine 58 from the library 50.

Figure 6:
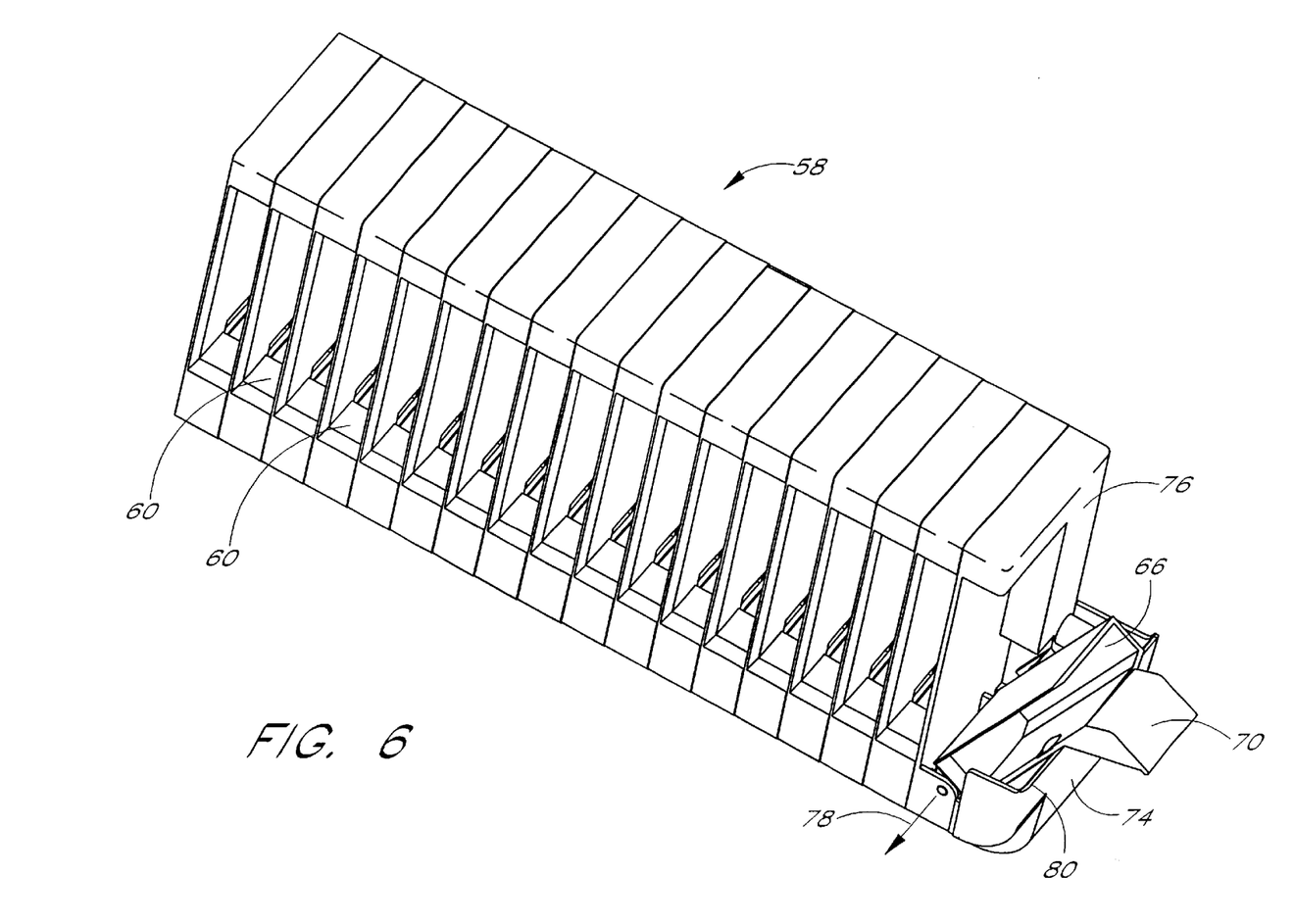
FIG. 6 is a perspective view of the magazine of media elements of FIG. 5 illustrating the pivotably movable cell in the pivoted open position.

The end storage location of the magazine 58 which forms the moveable mail slot may be constructed as a base portion 76, which has mounted therein the pivotably moveable cell portion 66. In the embodiment of FIGS. 5 and 6, the pivotably moveable cell portion 66 pivots about an axis 78 provided in the base 76 at the lower edge of the cell 66. In this Figure, the pivotably movable cell 66 is illustrated in the upright position.

In FIG. 6, the pivotably movable cell 66 is illustrated in the open, pivoted position so as to lean outward toward the opening in the library when the door 62 is open. As described above, the cell 66 pivots about the axis 78 adjacent to the bottom edge of the cell 66 until it contacts the top edge 80 of the magazine handle 74. Preferably, the height of the magazine handle 74 is selected so that the pivotably movable cell 66 leans outward enough to clear the top of the opening in the library when the door 62 is open.

Figure 7:
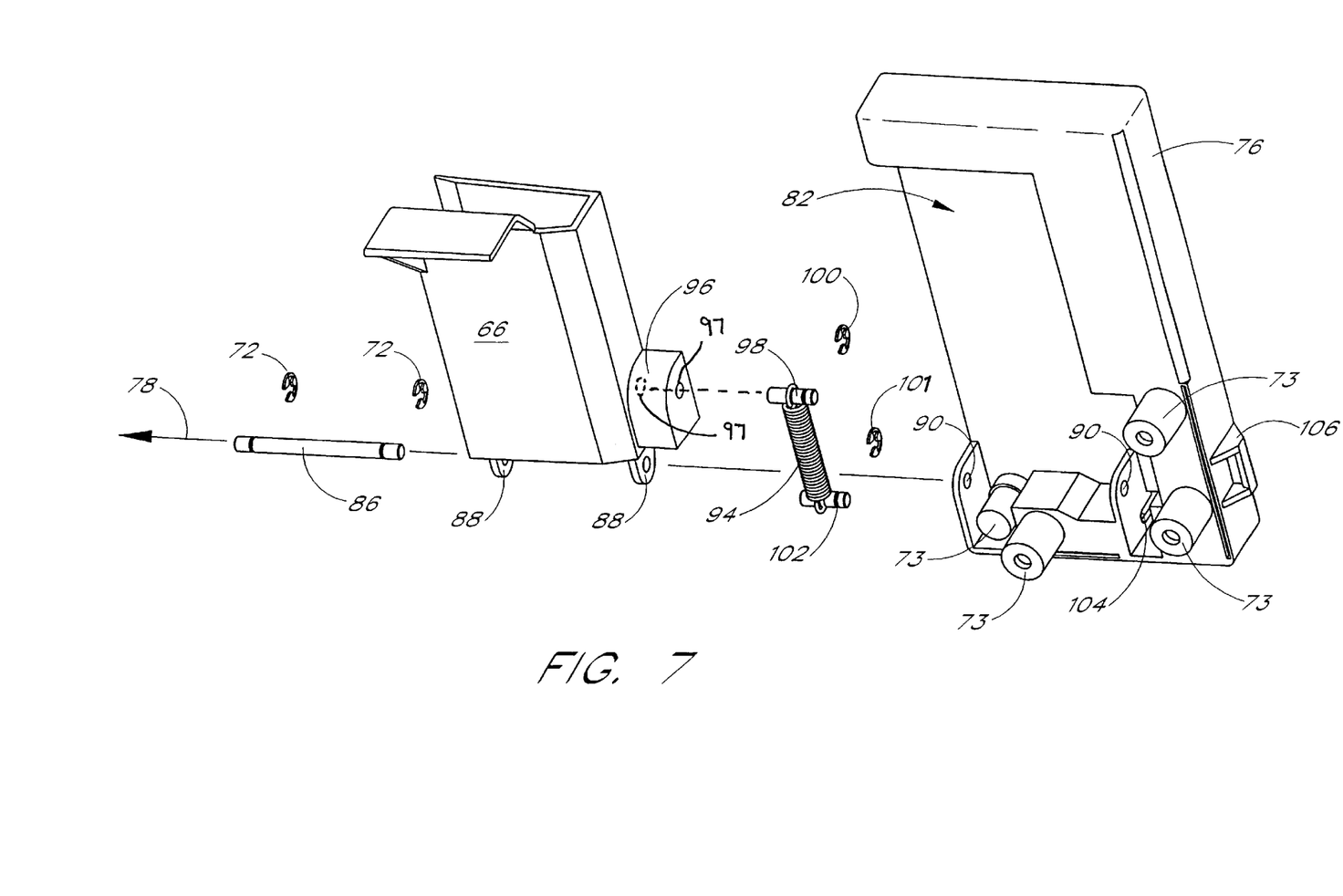
FIG. 7 is an exploded perspective view of the pivotably movable cell of the magazine of media elements illustrated in FIGS. 3 through 6.

An exploded view of the pivotably movable cell 66 and its attachment to the base portion 76 is shown in FIG. 7. The pivotably movable cell 66 sits in a cavity 82 in the base 76. The pivotably movable cell 66 is secured to the base 76 with a pivot shaft 86 which slides into holes 88 in the cell 66 body that fit inside and are aligned with holes 90 in the base 76. The pivot shaft 86 may be held in place with two snap fit e-rings 92, thus defining the axis 78 about which the cell 66 pivots.

The pivotably movable cell 66 may also be biased into the appropriate positions by a spring 94. The spring 94 includes an upper end loop which surrounds an upper slide fit pin 98. The upper pin 98 and attached spring 94 may be secured to the pivotably movable cell 66 inside a hollow spring cover 96 which is attached to the side of the pivoting cell 66. The upper slide fit pin 98 extends into receiver holes 97 provided in the hollow spring cover 96. The upper pin may be retained in place with another e-ring 100 in a manner similar to that described above with regard to the pivot shaft 86. However, in the embodiment illustrated, a single e-ring is used as the e-ring 100 slides into a slot (not shown) integral to the spring cover 96 so that the single e-ring can prevent pin 98 movement in both directions. .

A base pin 102 is similarly attached to the spring 94 via a loop in the lower end of the spring 94. The base pin 102 may rest in notches 104 (or holes) in the base 76 so as to affix the spring 94 to the base 76. The base pin 102 may also be retained in the notches with an e-ring 101 as described above.

The base pin 102 may be mounted to the base 76 at a location selected relative to the pivot axis 78 so that the pivotably movable cell 66 is bi-stable in the closed, upright position and also in the open, pivoted position. In one embodiment, shown in FIG. 7, the notch 104 is positioned slightly downward and rearward relative to the holes 90 which mount the pivot shaft 86. With this placement, the spring 94 becomes maximally extended at a point intermediate to the upright and downwardly pivoted positions. Thus, the spring is extended both as the cell is initially lowered from the upright position, and also when it is initially raised from the lowered position. The cell will therefore be biased to remain in either the downward or upright positions once placed there manually by a user. It may also be advantageous to position the base pin 102 such that the spring bias is stronger when the cell 66 is near the upright position, and is weaker when the cell is pivoted downward and is resting against the top edge 80 of magazine handle 74 as shown in FIG. 6.

To limit access to the mail slot and/or to the entire magazine 58 only to authorized users, the door 62 may be locked closed unless a user inputs an appropriate access code to the library. As is well known to those in the art, such access codes or passwords are typically entered via the keypad 53, although password entry via a host computer system may also be used in some embodiments. Upon entry of the proper code, the door 62 may be released automatically with, for example, an electrically actuated latch release mechanism such as a solenoid attached to the library housing. This provides one level of media security because users of the system may be selectively given the password, and thus only certain users will be able to access the mail slot.

The magazine itself may also be secured inside the enclosure 52 of the library unless released by a user inputting a proper access code to the library which is typically different than the mail slot access code. This may drive a second electrically actuated latch release mechanism such as a second solenoid mounted in the library and coupled to the magazine itself. In the embodiment of FIGS. 3–7, a magazine release solenoid in the library engages a latch 106 (FIG. 7) provided on the base 76 of the mail slot on the magazine 58. When released, the entire magazine 58 may slide out the open door 62. Multi-level security may therefore still be provided, without having a mail slot location which is physically separate from the media element magazine.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As is also stated above, it should be noted that the use of particular terminology when describing certain features or aspects of the present invention should not be taken to imply that the terminology is being re-defined herein to be restricted to including any specific characteristics of the features or aspects of the invention with which that terminology is associated. The scope of the invention is indicated by the appended claims and their equivalents rather than by the foregoing description.

What is claimed is:

1. A media element library comprising:
    a housing;
    a door mounted to said housing; and
    a media element magazine comprising (1) a linear array of a plurality of media element storage locations which are fixed with respect to said housing during library operation, and (2) one or more moveable media element storage locations, at least a first one of which is coupled to an end of said linear array so as to be manually movable towards said door, wherein said first moveable media element storage location is positioned relative to said door such that a media element in said first moveable media element storage location is accessible from outside the housing when said door is open.

2. The media element library of claim 1, wherein the media elements are tape cartridges.

3. The media element library of claim 1, wherein the media elements are optical disks.

4. The media element library of claim 1, wherein the media elements are magnetic disks.

5. The media element library of claim 1, further comprising an electrically actuated latch release mechanism coupled to the door.

6. The media element library of claim 1, further comprising an electrically actuated latch release mechanism coupled to the magazine.

7. The media element library of claim 1, further comprising:
    a first electrically actuated latch release mechanism coupled to the door and configured to release said door in response to a first access code input to the library; and
    a second electrically actuated latch release mechanism coupled to the magazine and configured to release said magazine in response to a second access code input to the library.

8. The media element library of claim 1, wherein said first moveable storage location is attached to the media element magazine by a pivot shaft which allows the first movable storage location to pivot about an axis.

9. The media element library of claim 1, further comprising a bias element attached to the first movable storage location and to the media element magazine.

10. A media element library comprising:
    a housing;
    an opening in a portion of said housing;
    a linear array of media element cells in fixed position with respect to said housing forming a media element magazine, wherein an end of the magazine is adjacent to said opening; and
    a moveable cell coupled to said end of said magazine adjacent to said opening, wherein said movable cell is manually movable towards said opening.

11. The media element library of claim 10, wherein the moveable cell is attached to the media element magazine by a pivot shaft which allows the first cell to pivot about an axis.

12. The media element library of claim 10, further comprising a bias element attached to the moveable cell and the media element magazine.

13. A method of accessing a media element from inside a media element library comprising:

delivering a media element from a fixed cell to a tiltable cell of a media element magazine;

tilting the cell toward an opening in the media element library and away from other cells in the media element magazine; and removing the media element from the cell.

14. The method of claim 13, wherein the opening is formed by opening a door.

15. A media element library comprising:

a housing having an access opening therein;

a plurality of coupled media element storage locations fixed relative to said housing forming a media element magazine;

a manually movable storage location in said media element magazine adjacent to said access opening;

means for manually moving said movable storage location so as to access a media element directly from said manually moveable storage location adjacent to said opening; and means for simultaneously restricting access to the fixed storage locations storing other media elements in said media element magazine.

16. A media element magazine comprising:

a linear array of media element cells in fixed relative position; and at least one movable cell coupled to one end of said linear array such that said at least one movable cell is manually movable towards a doorway upon installation in a media element library.

17. The media element magazine of claim 16, wherein the movable cell is attached to the media element magazine by a pivot shaft which allows the at least one movable cell to pivot about an axis.

18. The media element magazine of claim 17, further comprising a bias element attached to the at least one movable cell and the media element magazine.

19. A method of making a media element library comprising:

coupling a plurality of media element storage locations so as to form a linear array of media element storage locations which are fixed with respect to one another;

coupling a movable storage location to an end of said linear array such that said movable storage location is manually movable with respect to said end of said linear array; and positioning said movable storage location relative to an opening in a said media element library such that manual access through said opening to a media element stored in said movable storage location is allowed, and manual access through said opening to at least one media element stored in one or more other media element storage locations is restricted.

20. A media element library comprising:

a housing;

a door mounted to said housing;

a plurality of coupled media element storage locations forming a media element magazine, wherein at least a first media element storage location of said media element magazine is movable relative to other media element storage locations and positioned relative to said door such that a media element in said at least a first media element storage location is accessible from outside the housing when said door is open, and wherein at least a second media element storage location of said media element magazine is positioned relative to said door such that a media element in said at least a second media element storage location is inaccessible from outside the housing when said door is open; and a spring attached to the movable storage location and to the media element magazine, wherein the movable storage location is bi-stable in the closed, upright position and also in the open, pivoted position.

21. A media element library comprising:

a housing;

an opening in a portion of said housing;

a plurality of media element cells forming a media element magazine, wherein an end of the magazine is adjacent to said opening;

a moveable cell coupled to said end of said magazine adjacent to said opening; and a spring attached to the moveable cell and the media element magazine, wherein the moveable cell is bi-stable in the closed, upright position and also in the open, pivoted position.

22. A media element magazine comprising:

a plurality of media element cells configured to store media elements;

a movable cell coupled to one end of the media element magazine by a pivot shaft which allows the cell to pivot about an axis; and a spring attached to the cell and the media element magazine, wherein the movable cell is bi-stable in the closed, upright position and also in the open, pivoted position.

* * * * *